A. N. HADLEY.
OBLIQUE ANGLED GEARING.
APPLICATION FILED JUNE 20, 1910.
1,020,900.
Patented Mar. 19, 1912.
2 SHEETS—SHEET 1.
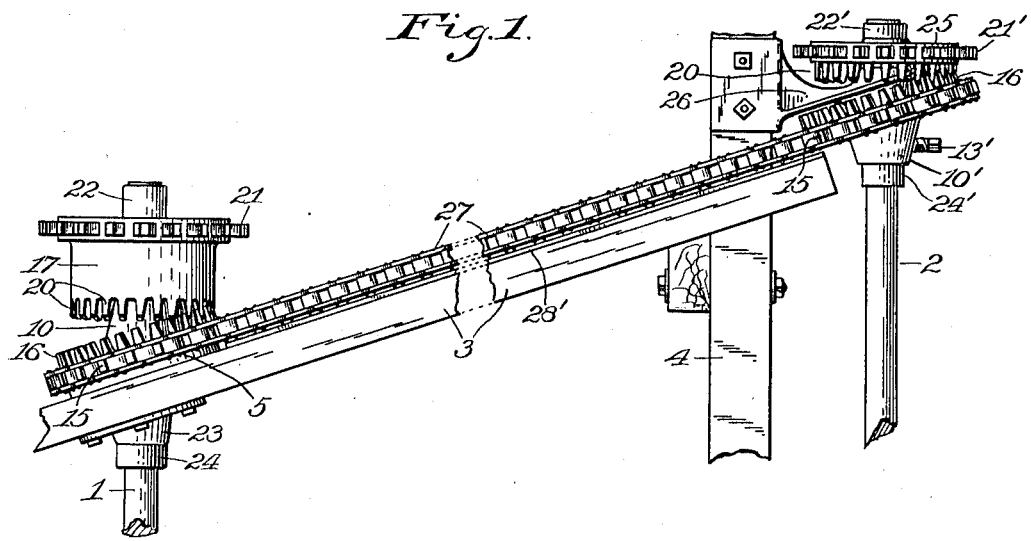
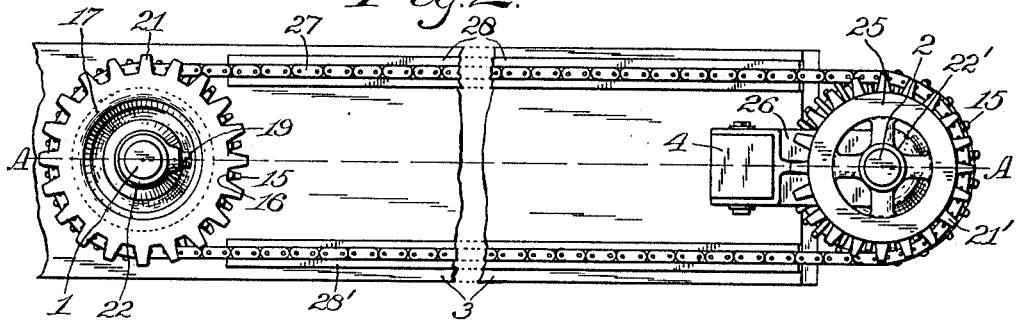
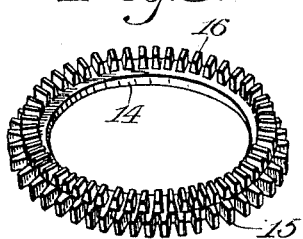
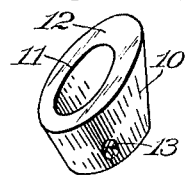
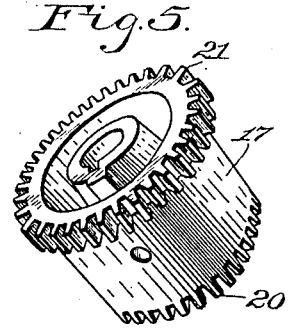
WITNESSES:
J. H. Gardner
K. R. Woddell
INVENTOR:
Artemus N. Hadley,
BY
E. T. Silvius,
ATTORNEY.
COLUMBIA PLANOGRAPH CO., WASHINGTON, D. C.

A. N. HADLEY.
OBLIQUE ANGLED GEARING.
APPLICATION FILED JUNE 20, 1910.
1,020,900.
Patented Mar. 19, 1912.
2 SHEETS—SHEET 2.
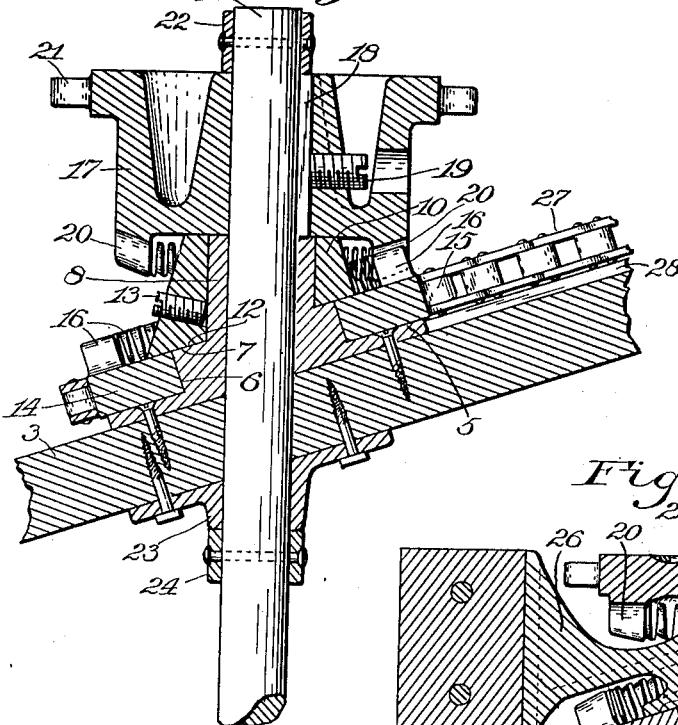
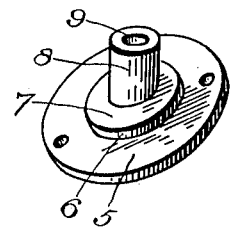
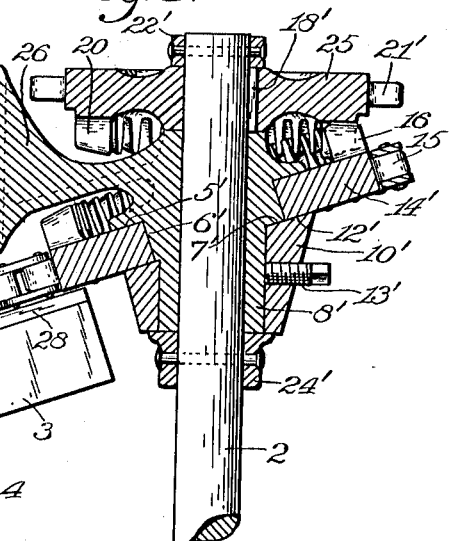
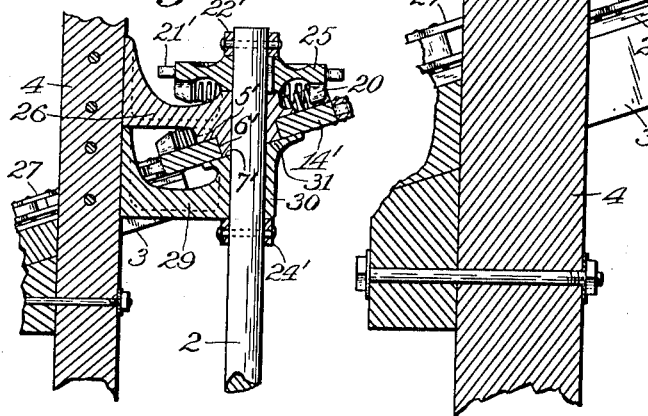
WITNESSES:
J. H. Gardner
K. R. Woddell
INVENTOR:
Artemus N. Hadley
BY
E. T. Silvius,
ATTORNEY.

UNITED STATES PATENT OFFICE.

ARTEMUS N. HADLEY, OF INDIANAPOLIS, INDIANA.

OBLIQUE-ANGLED GEARING.

1,020,900.

Specification of Letters Patent. Patented Mar. 19, 1912.

Application filed June 20, 1910. Serial No. 567,757.

*To all whom it may concern:*

Be it known that I, ARTEMUS N. HADLEY, a citizen of the United States, residing at Indianapolis, in the county of Marion and State of Indiana, have invented certain new and useful Improvements in Oblique-Angled Gearing; and I do declare the following to be a full, clear, and exact description of the invention, reference being had to the accompanying drawings, and to the letters and figures of reference marked thereon, which form a part of this specification.

This invention relates to gearing whereby a power-transmission wheel may be driven by a rotative shaft inclined to the plane of the wheel, or the shaft driven by the wheel; the invention having reference also to a specific kind of gearing for driving a belt wheel by a shaft when the plane of the wheel is inclined to the axis of the shaft, an example of which is disclosed in my application for Letters Patent for an improvement in corn-cutting and shocking machines, filed June 21, 1909, Serial No. 503,550, in which upright shafts drive belts or endless chains that are mounted and guided to operate in planes inclined to the shafts.

The object of the invention is to provide improved gearing of the above-mentioned character that will be adapted to be variously constructed in detail and be simple and not liable to become deranged in operation, and which will be strong, durable and economical in use; a further object being to provide oblique-angled gearing of simple and inexpensive construction for operatively connecting two rotative shafts together by means of a belt, when it is not possible or desirable to arrange the belt to operate in a plane at right angles to the shafts.

The invention consists in certain new and useful improvements in power-transmission gearing, and in the novel parts and combinations and arrangements of parts, as hereinafter particularly described and then defined in the accompanying claims.

Referring to the drawings, Figure 1 is an elevation illustrating the invention in one of its various applications, being in connection with two parallel rotative shafts; Fig. 2, a top plan of the preceding figure; Figs. 3, 4 and 5, perspective views of different parts of the improved gearing; Fig. 6, a fragmentary vertical section on an enlarged scale on the line A A in Fig. 2; Fig. 7, a perspective view of one of the parts of the gearing; Fig. 8, a fragmentary vertical section on an enlarged scale on the line A A in Fig. 2; and Fig. 9, a fragmentary vertical section similar to Fig. 8 excepting that modifications in details of construction are shown.

Similar reference characters in the different figures of the drawings indicate like parts or features of construction herein referred to.

In order to clearly describe the invention it is herein illustrated in connection with two parallel shafts 1 and 2, which may be either vertical or horizontal but for convenience are referred to as being vertical, and it will be apparent that the shafts are not required to be parallel one to the other, the gearing being capable of operating with one shaft inclined to the other when desired. The shaft 1 extends through a beam or plank 3 which extends at an inclined angle nearly to the shaft 2 where it is supported on a standard or post 4, so that it serves to guide the connecting belt and with the standard constitutes part of a frame for supporting the shafts and the gearing, other parts of the frame being obvious, and it will be apparent that the shafts and gearing may be otherwise supported when a belt-guide is not desired or required.

In one of the applications of the gearing to a shaft, a guide for a gear wheel is provided that is mounted fixedly on the beam 3 and has a guide face 5 that extends about the shaft 1 in a plane inclined to the axis of the shaft, for guiding one side of the gear wheel, the guide having an axial guide 6 thereon on which to journal the wheel, and having also a guide face 7 at the end of the guide 6 that is parallel to the guide face 5, the axial guide being at right angles to the guide faces and consequently inclined to the shaft. The wheel guide has also a cylindrical portion 8 extending from the end of the guide at an oblique angle to the face 7, there being a vertical bore 9 in the wheel guide that extends therethrough and receives the shaft rotatively, so that the guide serves as a journal bearing for the shaft. A collar 10 has an opening 11 therein and is fitted on the cylindrical portion 8, the collar having an oblique-angled face 12 that bears on and extends beyond the edge of the guide face 7 to guide the opposite side of the gear wheel, the collar being provided with a set-screw 13 whereby it is secured to the cylindrical portion 8 of the guide.

A gear wheel 14 is mounted rotatively on the guide 6, being between the guide faces 5 and 12, and the wheel may be of any suitable form to receive or transmit motion, being preferably provided on its periphery with teeth 15 for positive transmission of power, and may thus constitute a sprocket-wheel, one side of the wheel 14 having gear-teeth 16 thereon. A gear wheel 17 is secured to the shaft 1 by a key 18 and set-screw 19 at the end of the cylindrical portion 8, and one end of the wheel is so formed as to constitute a bevel-gear wheel, being provided with teeth 20 that mesh with the teeth 16 of the oblique-angled gear wheel. The gear wheel 17 preferably is adapted to serve in transmitting motion to or from the shaft, being preferably provided with suitable gear or sprocket teeth 21. A collar 22 is pinned to the shaft 1 against the wheel 17 when desired. A guide collar or journal-bearing 23 is secured to the under side of the beam 3, and a collar 24 is secured to the shaft 1 against the collar 23 to prevent longitudinal movement of the shaft in one direction relatively to the beam, or to support the beam in case it be desired. The other shaft 2 obviously may be connected with oblique-angled gearing constructed as above described, but preferably the gearing is slightly modified with respect to details of mountings thereof, an oblique-angled wheel and shaft guide receiving the shaft 2 rotatively and having a guide face 5′ and an axial guide 6′ and guide face 7′ and also a cylindrical portion 8′ on which is a collar 10′ secured by a set-screw 13′, all substantially as above described, there being a gear wheel 14′ on the axial guide that has the teeth 15 and also the teeth 16 thereon, the sides of the wheel 14′ being guided by the guide faces 5′ and 12′. A gear wheel 25 is secured to the shaft 2 by a key 18′, and preferably is safeguarded against movement along the shaft by a collar 22′ that is pinned to the shaft, the wheel 25 having the teeth 20 on one side thereof that mesh with the teeth 16 of the oblique-angled wheel 14′. The wheel 25 preferably has suitable teeth 21′ thereon whereby to impart motion to or from the shaft 2. A collar 24′ is secured to the shaft 2 against the end of the cylindrical portion 8′ to prevent longitudinal movement of the shaft in one direction, the wheel 25 preventing movement of the shaft in the opposite direction. The oblique-angled guide which guides the wheel 14′ is provided with an arm 26 which is secured to the standard or post 4, so as to be practically in connection with the beam or plank 3. The shafts 1 and 2 are operatively connected together by a driving chain 27 that extends about the oblique-angled gear wheels 14 and 14′ and is guided on the beam 3 which, preferably being wooden is provided with wearing plates 28 and 28′ against which the chain runs. It is apparent, however, that a guide for the chain will not be required when the shafts are horizontal.

In Fig. 9 a slight modification is shown which in some cases may be adopted, the cylindrical portion 8 or 8′ above described being omitted from the oblique-angled guide, one side of the oblique-angled gear wheel 14′ being guided by means of an arm 29 that is secured to the standard or post 4 and provided with a boss 30 that serves the purpose of the cylindrical portion and the collar 10 or 10′, the shaft 2 extending through the boss which serves as a journal-bearing for the shaft and has an inclined guide face 31 on one end to guide one side of the wheel 14′, the collar 24′ on the shaft being in contact with the other end of the boss. The construction and arrangement of parts in other respects, as will be seen correspond to that shown in Fig. 8.

The oblique-angled gearing is used for imparting motion either from or to a rotatable shaft or from one shaft to another as illustrated, and the shafts may be variously arranged relatively one to the other. The shaft 1 when suitably driven rotates the gear wheel 17 which rotates the gear wheel 14, the latter operating the driving chain 27.

Having described my invention, what I claim is—

1. In oblique-angled gearing, a wheel and shaft guide having a side guide face and an axial guide extending from the side guide face, said wheel and shaft guide having a bore extending therethrough at an oblique angle to the axis of the axial guide.

2. In oblique-angled gearing, a wheel and shaft guide having a side guide face and an axial guide extending from the side guide face, said wheel and shaft guide having a bore extending therethrough at an oblique angle to the axial guide, in combination with a guiding device fixedly supported adjacent the axial guide and having a guide face that is parallel to said side guide face.

3. In oblique-angled gearing, the combination of a wheel and shaft guide having a side guide face and an axial guide extending from said face, said wheel and shaft guide having a cylindrical portion extending from the end of said axial guide at an oblique angle thereto, said wheel and shaft guide having also a bore extending therethrough at an oblique angle to the axial guide and in alinement with said cylindrical portion, and a collar fixedly secured on said cylindrical portion and having an oblique-angled guide face that is parallel to said side guide face.

4. In oblique-angled gearing, the combination with a support, of a wheel and shaft guide having an arm fixedly secured to the support and having a side guide face and an axial guide extending from said face, said wheel and shaft guide having a bore extending therethrough at an oblique angle to the axial guide, an apertured guiding device fixedly supported adjacent the axial guide and having a guide face that is parallel to said side guide face, a wheel rotatably mounted on said axial guide between said guide faces and having gear teeth on one side thereof, a shaft extending rotatably through said bore and the apertured guiding device, and a second wheel fixedly secured to said shaft and having gear teeth on one side thereof meshing with the gear teeth of said first mentioned wheel.

5. In oblique-angled gearing, the combination of a beam having a guide face, a wheel and shaft guide fixedly connected with the beam and having a side guide face and an axial guide extending from said face, said wheel and shaft guide having a bore extending therethrough at an oblique angle to the axial guide, an apertured guiding device fixedly supported adjacent the axial guide and having a guide face that is parallel to said side guide face, a power-transmission wheel rotatably mounted on said axial guide between said guide faces and having gear teeth on one side thereof, a shaft extending rotatably through said bore and the apertured guiding device, a gear wheel fixedly secured to said shaft and having gear teeth on one side thereof meshing with the gear teeth of said power-transmission wheel, a power-transmission wheel rotatably supported adjacent said beam, and an endless chain extending about said power-transmission wheels and along the guide face of said beam.

6. In oblique-angled gearing, the combination of a beam having a guide face, a wheel and shaft guide fixedly connected with the beam and having an axial guide and also a cylindrical portion thereon, said wheel and shaft guide having a bore extending therethrough at an oblique angle to said axial guide, a power-transmission wheel rotatably mounted on said axial guide and having gear teeth on one side and also sprocket teeth on the periphery thereof, a collar secured on said cylindrical portion in contact with said wheel, a shaft extending rotatably through said bore, a gear wheel secured to said shaft and having gear teeth on one side thereof in mesh with the gear teeth of said power-transmission wheel, said gear wheel having gear teeth also on its periphery, a power-transmission wheel rotatably supported adjacent the beam and having sprocket teeth thereon, and an endless chain extending about said power-transmission wheels in engagement with the sprocket teeth thereof, said chain being in contact with the guide face of said beam.

In testimony whereof, I affix my signature in presence of two witnesses.

ARTEMUS N. HADLEY.

Witnesses:
P. A. HAVELICK,
E. T. SILVIUS.